United States Patent [19]

Ta et al.

[11] Patent Number: 5,076,401
[45] Date of Patent: Dec. 31, 1991

[54] SPRING-APPLIED, HYDRAULICALLY RELEASED BRAKE ACTUATOR HAVING POSITIVE CLEARANCE SLACK ADJUSTER MECHANISM

[75] Inventors: Cuong M. Ta, Taylors, S.C.; Albert A. McKay, Stoney Creek, Canada

[73] Assignee: Westinghouse Air Brake Company, Wilmerding, Pa.

[21] Appl. No.: 559,238

[22] Filed: Jul. 27, 1990

[51] Int. Cl.⁵ .................................. F16D 55/02
[52] U.S. Cl. .................... 188/71.9; 188/170; 188/196 V; 188/72.9
[58] Field of Search ............ 180/170, 71.9, 196 V, 180/196 D, 106 F, 72.9, 72.6; 303/71; 192/111 A

[56] References Cited

U.S. PATENT DOCUMENTS

| | | | |
|---|---|---|---|
| 3,995,722 | 12/1976 | Jones et al. | 188/170 X |
| 4,014,414 | 3/1977 | Yamamoto et al. | 303/71 X |
| 4,361,078 | 11/1982 | Cape et al. | 188/170 X |
| 4,548,301 | 10/1985 | Koshino et al. | 188/196 V X |
| 4,595,083 | 6/1986 | Mackenzie et al. | 188/196 D X |
| 4,895,228 | 1/1990 | Washbourn et al. | 188/196 D X |

Primary Examiner—Robert J. Oberleitner
Assistant Examiner—Lee W. Young
Attorney, Agent, or Firm—G. J. Falce

[57] ABSTRACT

A spring-applied, hydraulic pressure released brake actuator having a modular slack adjuster assembly in which a friction ring is arranged to limit axial movement of a nut member to which a brake shoe is connected, thereby establishing a predetermined brake shoe clearance with a vehicle wheel or brake disc. A spindle that is threadedly engaged with the nut member is connected to the actuator piston by means of a cone clutch that is disengaged during a brake release in the event the return stroke of the piston exceeds the predetermined brake shoe clearance due to brake shoe wear during the preceding brake application. This disengagement of the clutch causes the spindle to be rotated relative to the nut member under the influence of a slack adjuster spring in order to compensate the piston overtravel.

14 Claims, 4 Drawing Sheets

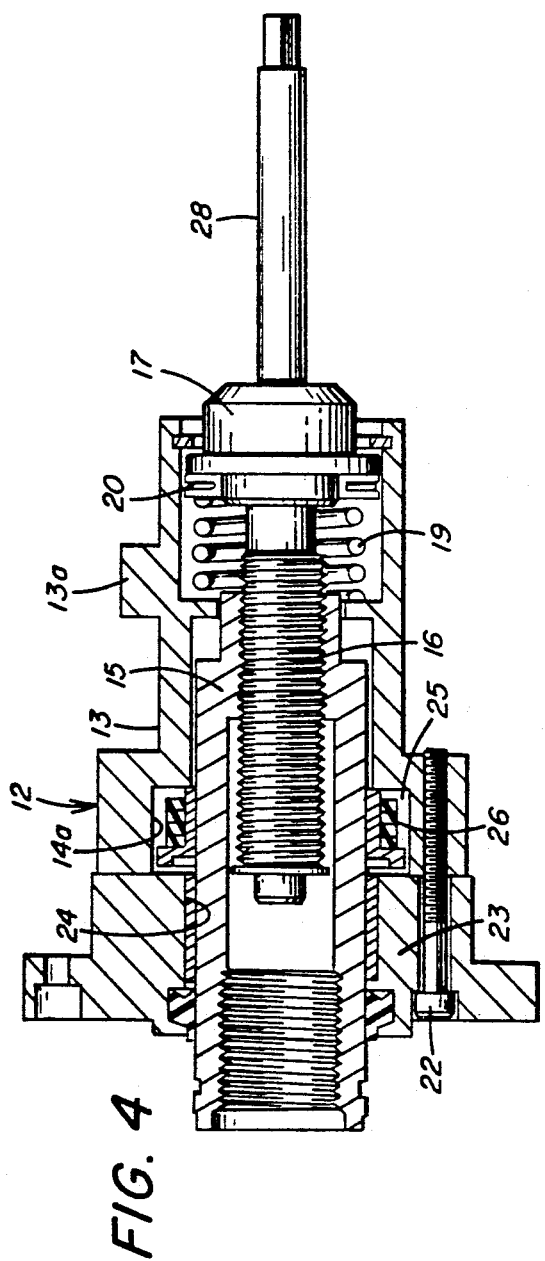
FIG. 4
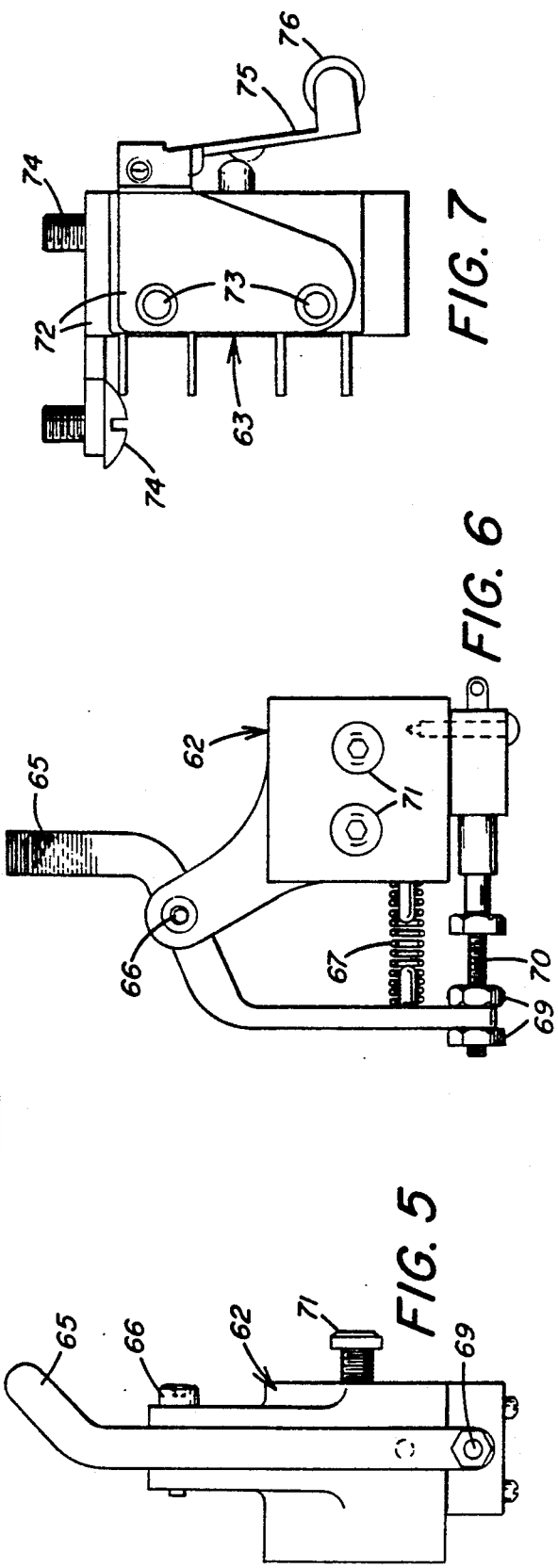
FIG. 7
FIG. 6
FIG. 5

111
SPRING-APPLIED, HYDRAULICALLY RELEASED BRAKE ACTUATOR HAVING POSITIVE CLEARANCE SLACK ADJUSTER MECHANISM

BACKGROUND OF THE INVENTION

The present invention relates to a spring-applied, hydraulic pressure released, railway vehicle brake unit and particularly to such brake units that employ positive brake shoe clearance slack adjusters.

Slack adjusters that maintain a positive brake shoe clearance, as opposed to zero clearance slack adjusters, are desirable from the standpoint of brake shoe drag being absent during brake release. Since some means other than the existing brake disc or vehicle wheel must be employed to provide a reference point against which such positive clearance slack adjusters operate, these positive clearance slack adjusters are inherently more expensive than their counterpart zero clearance slack adjusters. This higher cost, however, can be offset by the savings in fuel due to reduced energy consumption in the absence of brake shoe drag, particularly with the high cost of fuel in the industry today.

SUMMARY OF THE INVENTION

It is, therefore, an object of the invention to provide a simple, low-cost, positive clearance slack adjuster mechanism for a spring-applied hydraulically released brake actuator.

Another object of the invention is to provide a modular slack adjuster mechanism that can be removed and installed as a unit without requiring disassembly of other internal brake actuator parts.

Another object of the invention is to provide a manual release mechanism for releasing the brakes in the absence of hydraulic pressure.

Another object of the invention is to provide a manual means for retracting the brake shoes through the slack adjuster mechanism to accommodate replacement of worn brake shoes.

Another object of the invention is to provide a means for adjusting the actuator spring force without requiring disassembly of the brake actuator parts.

Briefly, in accordance with the foregoing, there is provided a brake actuator for controlling the application and release of at least one brake shoe relative to a member to be braked, such that a predetermined clearance is maintained therebetween. The actuator comprises a housing having a chamber in which a piston is reciprocably operable in response to the differential force of fluid pressure acting on one side and an application spring on the opposite side. Connected between the piston and at least one brake shoe is an actuator rod comprising a nonrotatable nut that is fixed to the brake shoe and a spindle that is screw-threaded with the nut, the spindle being connected to the piston through a clutch. Locking means limits retraction of the nut member during brake release to establish the predetermined brake shoe clearance and to thereafter effect clutch disengagement such that a slack adjuster spring acting on the spindle effects rotation of the spindle relative to the nut member to thereby increase the length of the actuator rod in accordance with the degree of brake shoe wear during the preceding brake application.

BRIEF DESCRIPTION OF THE DRAWINGS

These and other objects and advantages of the invention will be hereinafter discussed in greater detail in accordance with the drawings in which:

FIG. 4 is a sectional assembly view of the slack adjuster module employed in the brake actuator of FIG. 1, and FIGS. 5, 6 and 7 are outline views of indicator switches used in the brake actuator of FIG. 1.

DESCRIPTION AND OPERATION

Figure 1:
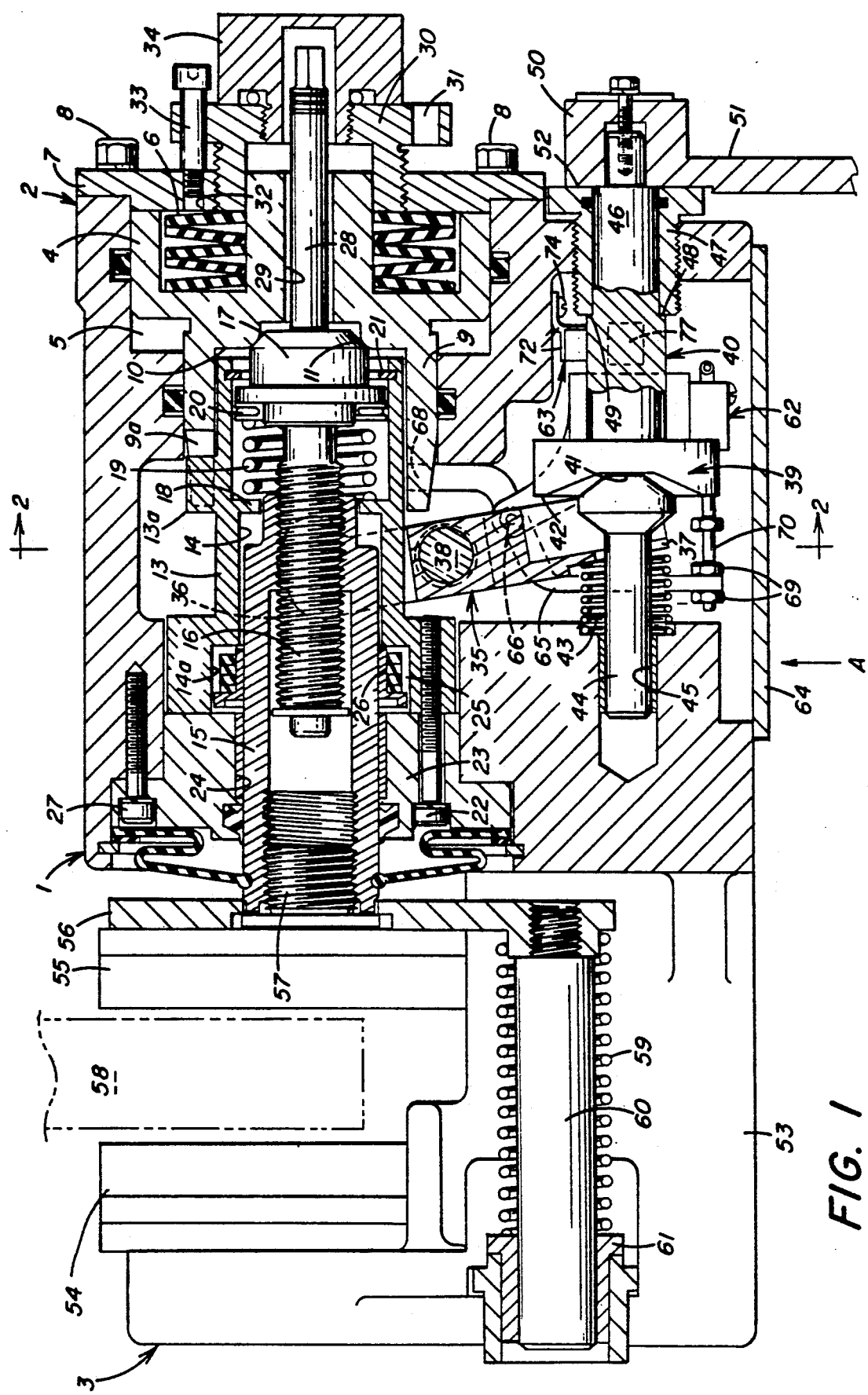
FIG. 1 is a sectional assembly view of a disc brake actuator arranged in accordance with the present invention.

In FIG. 1, there is shown a caliper-type disc brake unit 1 consisting of an actuator portion 2 and a brake shoe portion 3. Operably disposed in a hydraulic cylinder of actuator portion 2 is a piston 4 subject on one side to the force of hydraulic fluid under pressure in a chamber 5 and on the other side to the opposing force of a plurality of abutting Belleville-type, spring washers 6. A cover 7 is secured to one side of portion 2 by screws 8 to provide a seat against which the spring pack rests under compression. An inwardly-projecting, annular, hollow extension 9 of piston 4 is provided with a recessed base 10, in which a conical clutch seat 11 is formed.

A modular slack adjuster assembly 12, as shown in FIG. 4, is assembled as a unit and installed in the actuator portion 2 on the side opposite cover 7. The slack adjuster assembly 12 comprises a housing 13 having a central bore 14 in which an internally threaded nut member 15 is disposed for axial movement. An externally threaded spindle 16 has screw-threaded engagement with nut member 15 at one end and includes a cone clutch 17 at its other end. An inturned flange 18 of housing 13 provides a seat against which one end of a slack adjuster spring 19 rests. The other end of spring 19 acts through a bearing 20 to urge cone clutch 17 toward engagement with seat 11. A retaining ring 21 is provided in housing 13 to support cone clutch 17 when slack adjuster assembly 12 is removed from brake unit 1. Secured to slack adjuster housing 13 by screws 22 is a cover member 23 having an opening 24 containing a sleeve bearing that supports nut member 15 for axial movement. An anti-rotation lug 13a on the periphery of slack adjuster housing 13 is aligned with a slot 9a in piston extension 9 to prevent rotation of piston 4 as a result of its contact with spindle 16 through conical clutch 17. Cover member 23 forms, in conjunction with a counter bore 14a of bore 14, an annular cavity 25 in which a friction ring 26 is contained for frictionally engaging the periphery of nut member 15. The width or axial dimension of cavity 25 is greater than the corresponding dimension of friction ring 26 by a predetermined amount corresponding to the desired brake shoe/disc clearance, as will be hereinafter explained.

Slack adjuster assembly 12 is installed in actuator portion 2 as a modular unit and is secured in place in actuator portion 2 by screws 27. In this installed position of assembly 12, cone clutch 17 is engaged with clutch seat 11 under the compressive force of spring 19.

Threaded nut member 15 and spindle 16 cooperate with clutch seat 11 to provide an adjustable brake actuator rod. A slack adjuster stem 28 that is integral with cone clutch 17 projects through an opening 29 in piston 4 and is formed at its projecting end to receive a socket wrench or the like for a purpose hereinafter explained.

A screw-threaded adjusting member 30 of cover 9 encloses the projecting end of stem 28, being axially adjustable relative to cover 7 in order to vary the compressive force of spring washers 6. A plurality of holes 31 are arranged about the circumference of adjusting member 30, any one of which may be aligned with an indexing hole 32 in cover 9, as the screw member 30 is rotated. When the desired degree of compression of spring washers 6 is obtained, a screw 33 is inserted in the hole 31 aligned with indexing hole 32 to lock in the desired spring adjustment. A separately removable end cap 34 in the form of a hex nut is screwed into adjusting member 30 to permit access to the projecting end of slack adjuster stem 28 without changing the spring adjustment provided by screw member 30.

Figure 2:
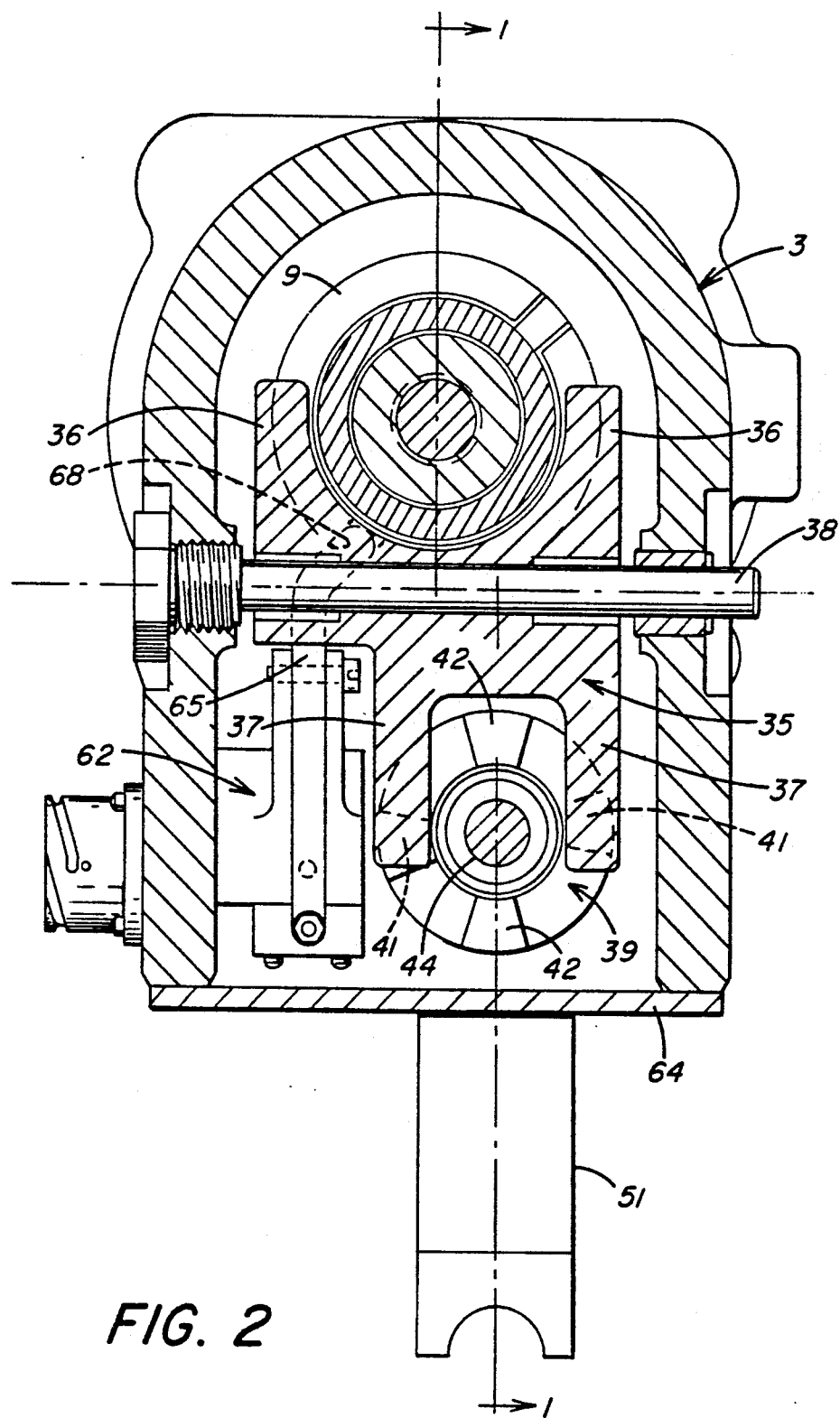
FIG. 2 is a sectional view taken along the line 2—2 of FIG. 1.

Also provided in actuator portion 2 is an H-shaped retracting lever 35 having bifurcated ends 36 and 37, as best seen in FIG. 2. Lever 35 is pivotally secured to the housing of actuator portion 3 by a pin 38 intermediate its ends 36 and 37, one end 36 being engageable with internal annular extension 9 of piston 4, and the other end being engageable with the face of a cam member 39 that is formed intermediate the ends of a cam shaft 40. As best seen in FIG. 2, the face of cam member 39 has a low set of lobes 41 and a high set of lobes 42. These lobes 41, 42 are spaced substantially 90° apart and are interconnected by ramps. In the release position shown, ends 36 of retracting lever 35 engage the low set of cam lobes 41 under the influence of a spring 43 that encircles shaft 40. Spring 43 acts between the housing of actuator portion 2 and a web interconnected with the bifurcated ends 36 and 37 of lever 35.

Shaft 40 is rotatably supported at one end 44 in a bushed bore 45 of the actuator housing and is rotatably supported near the opposite end 46 by an axially adjustable guide member 47 that is threaded into the actuator housing. A shoulder 48 of shaft 40 abuts one end 49 of guide member 47 to prevent axial movement of shaft 40 in a right-hand direction relative to its adjusted position set by guide member 47.

End 46 of shaft 40 projects externally of the actuator housing and is formed with a square-shaped end on which the hub 50 of a manual release handle 51 is mounted. Hub 50 abuts the other end 52 of guide member 47 to prevent axial movement of shaft 40 in a left-hand direction.

Brake shoe portion 3 includes a generally U-shaped body 53 in which brake shoe pads 54 and 55 are mounted, one brake pad 54 being fixed to body 53 by screws (not shown) and the other brake pad 55 being fixed to a brake head backing plate 56 by screws (also not shown). Brake head backing plate 56 is in turn fixed to the projecting end of slack adjuster nut member 15 by a locking screw 57 so as to be movable axially with piston 6 and the brake actuator rod comprised of spindle 16 and nut member 15. Being fixed to brake head backing plate 56, slack adjuster nut member 15 is prevented from rotating due to the torque generated by the threaded connection between nut member 15 and spindle 16. Brake shoe pads 54 and 55 are spaced apart a distance sufficient to accommodate a brake disc 58 indicated in phantom. Brake shoe portion 3 also includes a brake shoe return spring 59 that encircles a guide pin 60 that is connected by screw threads to movable brake head 56 at one end. Guide pin 60 is slidably supported at its other end in a bushing 61 that is retained in the U-shaped body 53 of brake shoe portion 3 by spring 59. The tension of spring 59 acts on brake head backing plate 56 in a direction to force the brake actuator rod and piston 4 in a brake release direction in concert with slack adjuster spring 19 acting on cone clutch 17. It should be noted at this point that the combined force of springs 19 and 59 acting on nut member 15 is less than the axial resistance exerted by friction ring 26.

The maximum stroke of piston 4 is limited by the axial distance between the rightward-most end of slack adjuster housing 13 and the recessed base 10 of piston 4 on which clutch seat 11 is formed. This distance is greater than the predetermined brake shoe/disc clearance established and maintained by slack adjuster assembly 12.

Figure 3:
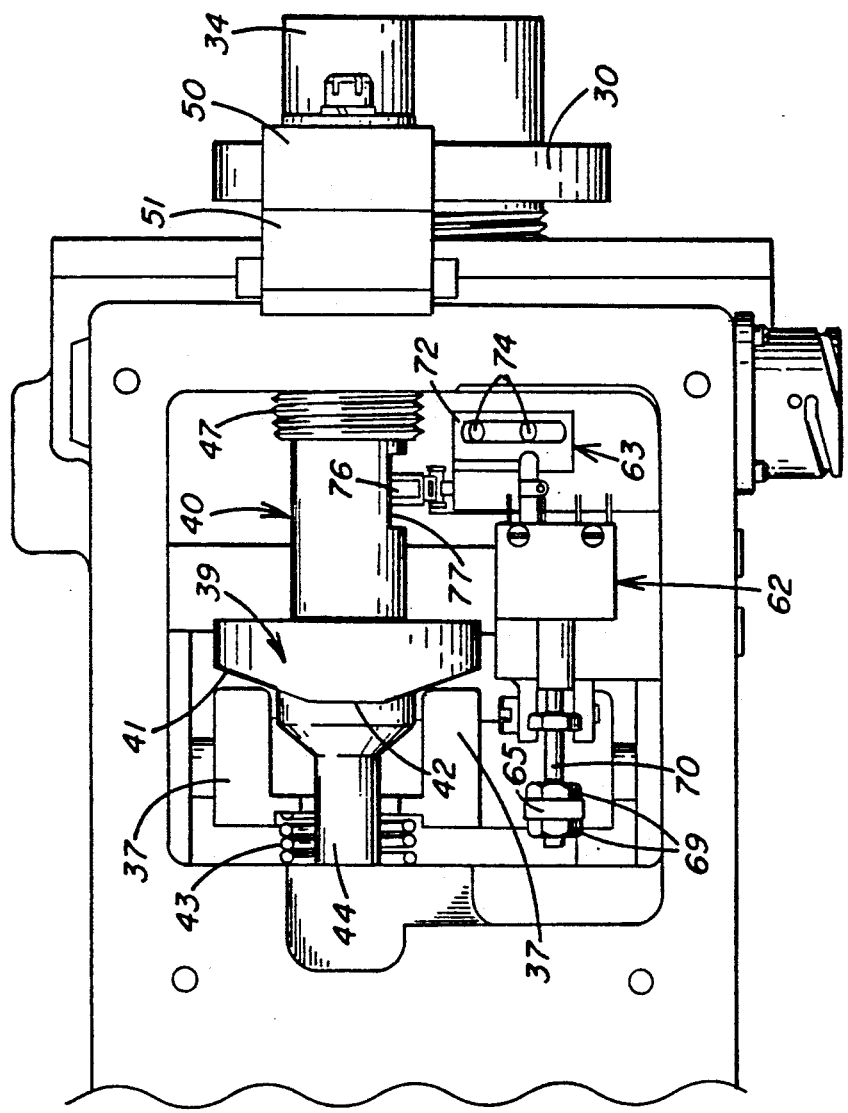
FIG. 3 is a plan view looking in the direction A of FIG. 1, with the bottom cover removed.

A pair of electrical microswitches 62 and 63 are mounted within actuator portion 3. Microswitch 62, shown in FIGS. 5 and 6, comprises a service brake switch, while microswitch 63, shown in FIG. 7, comprises a manual release switch. A cover 64 of actuator portion 2 can be removed, as shown in FIG. 3, to provide easy access to these switches for repair, maintenance and/or adjustment.

Service brake switch 62 is provided with a lever 65 that pivots about a pin 66 under the influence of a spring 67 to maintain constant engagement of lever 65 with a slot 68 formed in the internal extension 9 of piston 4, as shown in FIG. 2. Adjusting nuts 69 are provided on an actuating screw 70 to vary the position at which lever 65 is connected to screw 70. Varying the axial position of this connection adjusts the range of travel of piston 4 in which the service brake switch contacts are operated by screw 70, the entire switch mechanism being attached to actuator portion 2 by screws 71.

Manual release switch 63 is fixed to an L-shaped bracket 72 by screws 73, bracket 72 having an elongated slot via which screws 74 adjustably mount switch 63 to actuator portion 2. The switch contacts are controlled by an arm 75 that is pivotally operated by a roller actuator 76 at one end, that rides on the periphery of camshaft 40. Roller 75 engages a flat 77 on camshaft 40 when manual release handle 51 is in its non-actuated position, as shown. The roller actuator operates switch 63 when shaft 40 is rotated. The point of engagement of roller actuator 76 with flat 77 is at the side of shaft 40 to isolate vertical vibration of shaft 40 from the switch When the brakes are in a released condition, as shown in FIG. 1, the force exerted on piston 4 by spring washers 6 is counteracted by the force of hydraulic fluid in chamber 5, and piston 4 is pressed against cover 7. With the braking force thus relieved from brake head backing plate 56, brake shoe release spring 59 is effective to spread brake shoes 54, 55 away from the respective opposite faces of brake disc 58 an amount corresponding to the predetermined brake shoe/disc clearance, as controlled by slack adjuster assembly 12.

To effect a brake application, hydraulic fluid under pressure in chamber 5 is reduced an amount corresponding to the desired braking force, thereby allowing spring washer 6 to move piston 4 in a leftward direction as viewed in the drawing.

Since cone clutch 17 of spindle 16 is engaged with seat 11 under the influence of spring 19, spindle 16 is also moved in a leftward direction with piston 4. Nut member 15, which is threadedly connected to spindle 16, in turn, acts through brake head backing plate 56 to urge brake shoe 55 into engagement with one face of brake disc 58. At the same time, the reaction force of spring washers 6 acts through the disc brake unit body which is movably mounted in a well-known manner, to force brake shoe 54 rightwardly into braking engagement with the opposite face of braking disc 58, the combined force of the respective brake shoes effecting a brake application corresponding to the reduction of hydraulic brake pressure from chamber 5. Due to this "floating" action of the brake unit 1, which is made possible by the above-mentioned movable mounting arrangement of the caliper unit (not shown), the respective brake shoes exert equal brake forces on the brake disc 58.

An indication of the aforementioned brake application is provided by service brake switch 62, the lever 65 of which is forced to move with extension 9 of piston 4. As lever 65 is rotated about pivot pin 66, actuating screw 70 is forced in a right-hand direction to close the switch contacts and provide a signal indicative of a brake application being in effect.

It will be appreciated that relative movement occurs between nut member 15 of slack adjuster assembly 12 and the slack adjuster housing 13, which is fixed to the body of actuator portion 3, during such brake application. Accordingly, friction ring 26 is pulled leftwardly with nut member 15, due to its frictional engagement with the periphery thereof, until it engages cover 23 forming the left-hand side of annular groove 25 in housing 13. This will normally occur at the point of engagement of brake shoes 54, 55 with brake disc 58. In the event brake shoe/disc wear occurs during the brake application, nut member 15 advances leftward relative to friction ring 26 a distance corresponding to the brake shoe/disc wear. This continued leftward movement of nut member 15 to maintain brake shoe/disc engagement occurs because the friction force exerted on nut member 15 by friction ring 26 is less than the axial force exerted thereon by spring washers 6 acting through piston 4.

During a subsequent brake release in response to reapplication of hydraulic fluid under pressure to chamber 5, sufficient to overcome the force of spring washers 6, piston 4 is moved rightwardly. Release spring 59 acting through brake head backing plate 56 forces nut member 15 and spindle 16 to follow piston 4, during which movement slack adjuster spring 19 is effective to maintain cone clutch 17 engaged with seat 11. Friction ring 26 is concurrently pulled in a rightward direction by its frictional engagement with the periphery of nut member 15, until friction ring 26 engages the right-hand side of annular groove 25, such movement corresponding to the desired brake shoe clearance to be maintained. Since the friction force exerted by friction ring 26 on nut member 15 is greater than the axial force exerted on nut member 15 by the combined effect of return spring 59 and slack adjuster spring 19, continued rightward movement of nut member 15 is terminated following engagement of friction ring 26 with the right-hand side of groove 25. Consequently, the brake shoes 54, 55 are only retracted from braking disc 58 a distance corresponding to the axial movement of friction ring 26 in groove 25, this distance being the desired brake shoe clearance.

Any overtravel of piston 4, due to brake shoe/disc wear during the preceding brake application, is compensated by the continued movement of piston 4 until engagement occurs with cover 7. During this continued rightward movement of piston 4, clutch seat 11 is pulled away from cone clutch 17, since the friction locked nut member 15 prevents spindle 16 from continuing to follow piston 4. With disengagement of clutch 11, the axial force exerted on spindle 16 by slack adjuster spring 19 causes spindle 16 to rotate relative to nut member 15 due to its threaded connection therewith. Spindle 16 is thus unscrewed relative to nut member 15 until cone clutch 17 is moved axially back into engagement with seat 11 to stop further rotation of spindle 16. In this manner, the axial length of the brake actuator rod comprised of nut member 15 and spindle 16 is increased an amount corresponding to the piston overtravel, thereby maintaining the piston stroke constant, while concurrently establishing and maintaining a predetermined brake shoe/disc clearance.

If it is desired to manually release a brake application, such as when a car is on the siding with no source of pressurized hydraulic fluid available, release handle 51 may be turned in either direction of rotation to, in turn, rotate cam shaft 40. This rotation of cam shaft 40 causes the bifurcated ends 37 of retracting lever 35 to be ramped from the low lobes 41 of cam 39 onto the high lobes 42, thereby forcing ends 37 of lever 35 to move axially in a left-hand direction, as viewed in FIG. 1. In this manner, rotation of handle 51 substantially 90° effects rotation of lever 35 about pivot pin 38 sufficiently to cause ends 36 to force piston 4 to its release position against cover 7. In that lobes 41 and 42 are flat faced and spring washers 6 exert a strong counterforce through lever 35, handle 51 and cam 39 will remain in this release position without requiring any holding force whatsoever on handle 51 until the handle is positively turned back to its normal position.

In order to accommodate wear and dimensional tolerances, handle 51 may be loosened from end 46 of crankshaft 40 to allow the axial position of guide member 47 relative to actuator body 2 to be adjusted through its screw threaded connection therewith. When handle 51 is subsequently tightened in place against shoulder 52 of guide member 47, the axial position of crankshaft 40 is locked onto adjustable guide member 47. It will be apparent, therefore, that in order to assure full and proper retraction of piston 4 during a manual release, guide member 47 can be adjusted to control the axial position of crankshaft 40 and thus the precise release position of piston 4 when handle 51 is rotated 90° from its normal position to its release position.

Retraction of piston 4 by release handle 51 in order to manually release the brakes by withholding the force of spring washers 6 is indicated by manual release switch 63. As shaft 46 is rotated by handle 51, roller 75 is forced to ride off of flat 76 and onto the periphery of shaft 46, thereby depressing arm 75 to close the switch contacts. The roller position relative to flat 76 can be adjusted by screws 74 which secure the body of switch 63 to the switch mounting bracket 72.

When changout of worn brake shoes is required, the foregoing manual release of the brakes is accomplished, as above explained. End cap 34 is then unscrewed from cover 7 to expose the projecting end of adjusting stem 28. The movable brake shoe 55 can be fully retracted by rotating the slack adjuster stem 28 (by means of a socket wrench or the like applied to the projecting end) in a clockwise direction. This will initially compress spring 19 until it becomes solid. Continued rotation of stem 28 causes nut member 15 to be pulled in a rightward direction until brake shoe 55 is fully retracted from brake disc 58, it being understood that the pulling force imparted to nut member 15 by the rotation of spindle 16 through its threaded connection with nut member 15 is sufficient to overcome the friction force imparted to the periphery of nut member 15 by friction ring 26. Following replacement of brake shoe 55, a pry bar may be employed to force brake shoe 49 away from brake disc 58, causing the movably mounted brake unit, including brake head backing plate 56, to be moved relative to disc 58 to provide space to accommodate installation of a new brake shoe 49.

To restore brake unit 11 to an operative condition following replacement of the worn brake shoes, the wrench holding force on stem 28 is released, allowing spring 19 acting through thrust bearing 20 to effect rotation of stem 28 in a counterclockwise direction. This, in turn, causes spindle 16 to unscrew from nut member 15 until engagement of cone clutch 17 with clutch seat 11 is re-established. Several ensuing brake applications and releases may be required to re-establish the desired brake shoe clearance, as previously explained, following restoration of release handle 51 to its normal position.

Should the slack adjuster assembly 12 malfunction, the entire module may be removed as a unit without disturbing other ports of the brake unit. This is accomplished by removing the caliper brake unit 1 from its mounting so that brake shoes 54,55, as well as brake head backing plate 56 can be removed. Following removal of the slack adjuster boot and retaining ring, screws 27 are then removed to allow the complete slack adjuster assembly 12, as shown in FIG. 4, to be withdrawn from the body of actuator portion 2, by way of the U-shaped opening exposed in brake shoe portion 3 by removal of brake shoes 54,55 and brake head backing plate 56. A previously serviced or rebuilt slack adjuster unit may then be installed and the unit placed back in service. Since this replacement of slack adjuster assembly 13 requires removal of brake shoes 54,50, it would be expedient to replace the slack adjuster assembly with a serviced unit at each changeout of brake shoes. In replacing the slack adjuster assembly with a rebuilt or serviced unit periodically, on-site repair can be virtually eliminated, saving considerable expense in vehicle down time and in-field service personnel.

We claim:

1. A brake actuator for controlling the application and release of at least one brake shoe relative to a member to be braked, including slack adjuster means for compensating brake shoe wear while maintaining a predetermined clearance between said at least one brake shoe and said member to be braked comprising:
   (a) a chamber to which fluid under pressure is supplied and released;
   (b) a piston reciprocably operable in said chamber and having an internal hollow extension with a recessed base;
   (c) an actuating spring acting on said piston in a brake application direction in opposition to the opposing force of fluid pressure in said chamber acting on said piston in a brake release direction;
   (d) said slack adjuster means comprising:
      (i) an axially movable nut member fixed to said at least one brake shoe so as to be non-rotatable;
      (ii) a spindle threadedly connected to said nut member;
      (iii) a clutch member fixed on said spindle;
      (iv) a clutch seat formed on said base of said piston coaxially with said spindle adjacent said clutch member;
      (v) a slack adjuster spring acting axially on said spindle in said brake release direction to effect frictional engagement between said clutch member and said clutch seat;
   (e) locking means for limiting axial movement of said nut member in response to movement of said piston in said brake release direction a distance corresponding to said predetermined clearance, said limited axial movement of said nut member causing said clutch means to effect said disengagement between said clutch seat and said clutch member in response to continued movement of said piston in said release direction a distance exceeding said predetermined clearance, said locking means comprising:
      (i) a bore in which said nut member is disposed for axial movement;
      (ii) an annular groove in said bore;
      (iii) an annular friction member disposed in said annular groove so as to engage the surface of said nut member with a force less than the force exerted on said piston by said actuating spring, the axial dimension of said annular groove being greater than the corresponding dimension of said piston member by an amount corresponding to said predetermined clearance;
   (f) a release spring acting in concert with said slack adjuster spring to urge said spindle in said brake release direction, the friction force exerted on said nut member by said friction member being greater than the combined forces of said slack adjuster spring and said release spring, said slack adjuster spring effecting rotation of said spindle through said threaded connection with said nut member and said spindle an amount corresponding to said distance exceeding said predetermined clearance; and
   (g) manual retracting means for effecting movement of said piston in said brake release direction in opposition to said actuating spring comprising:
      (i) a handle;
      (ii) a rotatable shaft connected to said handle;
      (iii) a cam member formed on said shaft;
      (iv) a face portion of said cam member;
      (v) a retracting lever engageable at one end thereof with said piston and at the other end thereof with said face portion of said cam member; and
      (vi) a pivot pin on which said retracting lever is rockably mounted at a location intermediate said one end and said other end of said retracting lever.

2. A brake actuator, as recited in claim 1, wherein the profile of said face portion of said cam member is such as to effect said movement of said piston in said release direction to a fully retracted position in response to rotation of said shaft substantially 90° in either direction from a neutral position.

3. A brake actuator, as recited in claim 2, further comprising a spring acting on said retracting lever in a direction to maintain said other end thereof in continuous engagement with said face portion of said cam member, whereby said one end of said retracting lever is disengaged from said extension of said piston in said neutral position of said handle.

4. A brake actuator, as recited in claim 3, further comprising brake actuator switch means for indicating when said piston is in a brake application position.

5. A brake actuator, as recited in claim 4, further comprising manual release switch means for indicating when said piston has been moved to said fully retracted position by said manual retraction means.

6. A brake actuator, as recited in claim 1, wherein said slack adjuster means further comprises a housing removably secured to said brake actuator.

7. A brake actuator, as recited in claim 6, further comprising means for preventing rotation of said piston comprising:
   (a) a slot in said internal annual extension of said piston; and
   (b) an anti-rotation lug on said slack adjuster housing disposed in said slot.

8. A brake actuator, as recited in claim 1, wherein said clutch member includes a slack adjuster stem having an operating end projecting externally of said brake actuator, said operating end being adapted to receive a tool to rotate said stem and thereby effect manual rotation of said spindle and accordingly adjust the axial dimension of said nut member and said spindle.

9. A brake actuator, as recited in claim 8, further comprising:
   (a) a cover enclosing said chamber on the side of said piston on which said actuating spring acts;
   (b) an adjustable portion of said cover having screw-threaded engagement therewith, said adjustable portion being engageable with said actuating spring to selectively adjust the degree of compression of said spring.

10. A brake actuator, as recited in claim 9, wherein said piston includes a central opening therein through which said slack adjuster stem passes, said adjustable portion of said cover having a separately removable end cap enclosing said operating end of said slack adjuster stem.

11. A brake actuator, as recited in claim 1, further comprising:
    (a) a shoulder on said shaft; and
    (b) an annular bushing having a bore in which said shaft is rotatably supported, said bushing extending between said shoulder and said handle and having axially threaded engagement with the body of said brake actuator to adjust the axial position of said cam member relative to said retracting lever.

12. A brake actuator for controlling the application and release of at least one brake shoe relative to a member to be braked, including slack adjuster means for compensating brake shoe wear while maintaining a predetermined clearance between said at least one brake shoe and said member to be braked comprising:
    (a) a chamber to which fluid under pressure is supplied and released:
    (b) a piston reciprocably operable in said chamber;
    (c) an actuating spring acting on said piston in a brake application direction in opposition to the opposing force of fluid pressure in said chamber acting on said piston in a brake release direction;
    (d) a clutch seat formed on said piston;
    (e) said slack adjuster means comprising:
       (i) a housing removably secured in an opening formed in said brake actuator;
       (ii) a bore in said housing, said bore being open at one end and delimited at the other end by an inturned flange;
       (iii) a nut member reciprocably disposed in said bore, said nut member being connectable with said at least one brake shoe so as to be non-rotatable;
       (iv) an annular groove in said bore;
       (v) a friction ring in said annular groove having engagement with the surface of said nut member, the axial dimension of said annular groove being greater than the corresponding dimension of said friction member by an amount corresponding to said predetermined clearance, the force exerted on said piston by said actuating spring being greater than the force of friction exerted on said nut member by said friction ring;
       (vi) a further bore in said housing having one end open and the other end delimited by said inturned flange;
       (vii) a spindle threadedly connected at its one end to said nut member, the other end of said spindle projecting into sad further bore and forming a clutch member;
       (viii) a retaining ring in said further bore approximate said one end thereof, and
       (ix) a slack adjuster spring acting in said further bore between said clutch member and said retaining ring to urge said spindle in said brake release direction to effect engagement of said clutch member with said clutch seat, said slack adjuster spring during disengagement between said clutch member and said clutch seat effecting rotation of said spindle through said threaded connection with said nut member to thereby increase the axial dimension of said nut member and said spindle an amount corresponding to said distance exceeding said predetermined clearance; and
    (f) a release spring acting in concert with said slack adjuster spring to urge said spindle in said brake release direction, the friction force exerted on said nut member by said friction ring being greater than the combined force of said slack adjuster spring and said release spring.

13. A brake actuator, as recited in claim 12, wherein said piston comprises an internal hollow extension having a recessed base, said clutch seat being formed on said base coaxially with said spindle adjacent said clutch member so as to engage and maintain said clutch member spaced from said retaining ring when said slack adjuster means is installed in said opening.

14. A brake actuator, as recited in claim 13, further comprising:
    (a) a slot in said hollow extension of said piston; and
    (b) an anti-rotation lug on said slack adjuster housing adapted to engage said slot when said slack adjuster housing is installed in said opening.

* * * * *